United States Patent [19]

Caveney

[11] Patent Number: 4,728,064
[45] Date of Patent: Mar. 1, 1988

[54] RELEASABLE CABLE TIE

[75] Inventor: Jack E. Caveney, Hinsdale, Ill.

[73] Assignee: Panduit Corp., Tinley Park, Ill.

[21] Appl. No.: 874,261

[22] Filed: Jun. 13, 1986

[51] Int. Cl.⁴ .............................................. F16L 3/08
[52] U.S. Cl. .................. 248/74.3; 24/16 PB; 248/73
[58] Field of Search ............. 248/74.3, 73, 74.1, 248/221.3; 24/16 PB, 305, 336, 664, 326, 17 A, 17 AP; 411/437, 510, 508

[56] References Cited

U.S. PATENT DOCUMENTS

| | | | |
|---|---|---|---|
| 3,054,585 | 9/1962 | Roberts et al. | |
| 3,367,701 | 2/1968 | Wenk | 24/16 PB |
| 3,991,444 | 11/1976 | Bailey | |
| 4,003,106 | 1/1977 | Schumacher | 24/16 PB |
| 4,235,404 | 11/1980 | Kraus | 248/73 X |
| 4,261,539 | 4/1981 | Albern | 248/74.3 X |
| 4,342,438 | 8/1982 | Speedie | 248/73 |
| 4,389,754 | 6/1983 | Sohma | |
| 4,518,297 | 5/1985 | Kraus | 24/16 PB X |
| 4,541,153 | 9/1985 | Schaty | 248/73 X |
| 4,570,303 | 2/1986 | Richmond | 24/16 PB |
| 4,579,493 | 4/1986 | Schaty | 411/510 |
| 4,586,570 | 5/1986 | Swift | 24/16 PB X |

Primary Examiner—J. Franklin Foss
Attorney, Agent, or Firm—Charles R. Wentzel; Mark D. Hilliard

[57] ABSTRACT

A releasable ladder fastener for securing elongate objects in a bundle having a stud mount boss for securing the ladder fastener to a stud mount. The releasable ladder fastener includes resilient barbed locking members formed at a first end of the ladder strap that releasably engage the side rails of the ladder fastener strap to releasably lock the first end of the ladder strap to the strap of the ladder fastener.

12 Claims, 7 Drawing Figures

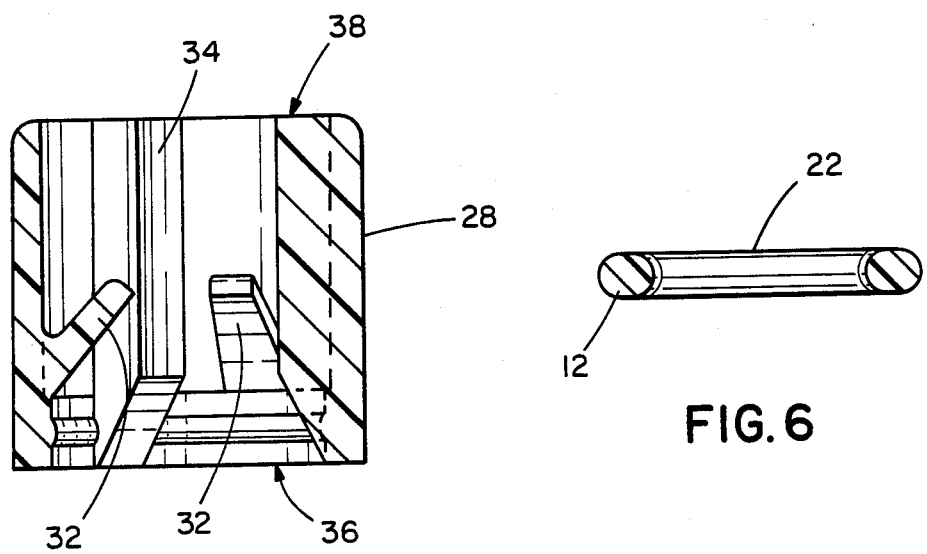
FIG. 5
FIG. 6
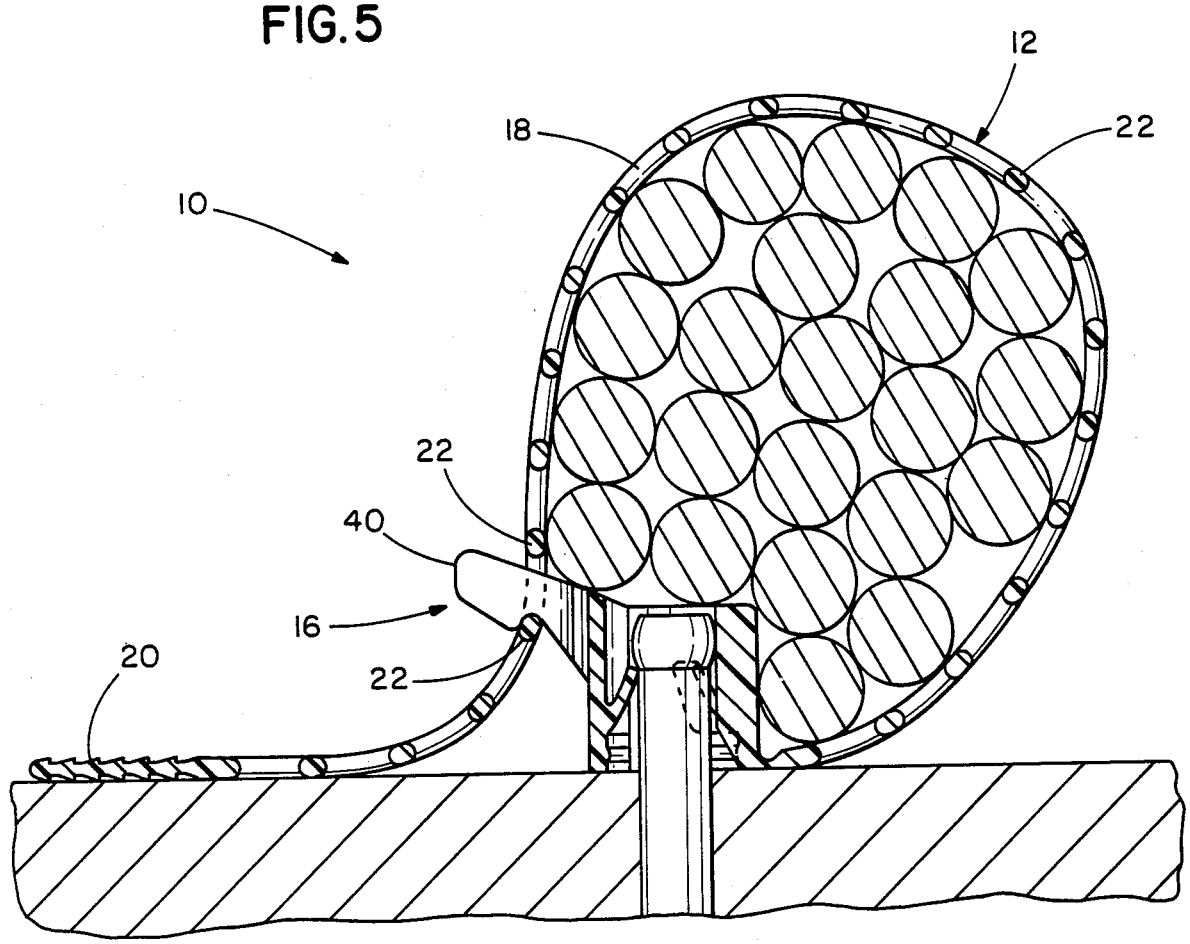
FIG. 7

RELEASABLE CABLE TIE

The invention relates to elongate ladder fasteners for releasably securing discrete elongate objects together to form a bundle and for securing the bundle to a mounting surface.

BACKGROUND OF THE INVENTION

Many varieties of fasteners having ladder strap portions and an integral locking head have been proposed for securing wires or the like in bundles. A number of these fasteners include structures that provide for the attachment of the fastener and the bundle of wires secured by the fastener to a mounting surface. It is desirable that a fastener be easily applied, positively locking to ensure that it does not inadvertently release a bundle of wires and at the same time easily releasable to allow access to the wire bundle.

Although a number of proposed fastener structures are stated to be positively locking, releasable and specially adapted to secure the fastener to a mounting surface, the actual ease of application and releasability of these fasteners leaves significant room for improvement in the art. The proposed fasteners require careful manipulation and/or require the application of high application forces to secure the ladder strap to a locking head and require either very careful manipulation or the application of brute force to release the ladder strap from the locking head.

SUMMARY OF THE INVENTION

Among the several objects of the present invention may be noted the provision of a ladder fastener that positively and reliably locks to encircle and fasten a bundle of wires or the like; the provision of a ladder fastener that is easily applied; the provision of a ladder fastener that can be easily released to allow access to a bundle secured therein; the provision of a ladder fastener that is specially adapted to secure the fastener to a mounting surface; and the provision of a ladder fastener that has a one-piece construction and is economical and simple to manufacture.

In general, a releasable ladder fastener includes a ladder strap portion having a pair of elongate parallel rails joined by a plurality of spaced interposed rungs, a fastener mounting means for securing the fastener to a mounting surface formed adjacent an end of the strap portion and resilient latching means formed on the fastener mounting means for engaging the side rails of the strap portion with two spaced apart opposed resiliently mounted locking members within respective side rail latching recesses of the locking members to releasably lock the resilient latching means within the ladder strap portion.

BRIEF DESCRIPTION OF THE DRAWINGS

FIG. 5 is a sectional view of the stud mount boss of the fastener of FIG. 1 taken along line 5—5 of FIG. 2.

FIG. 6 is a sectional view of the ladder strap of the fastener of FIG. 1 taken along line 6—6 of FIG. 2.

FIG. 7 is a sectional view of the fastener of FIG. 1 as applied around a bundle of wires.

PREFERRED EMBODIMENT FOR CARRYING OUT THE INVENTION

Figure 1:
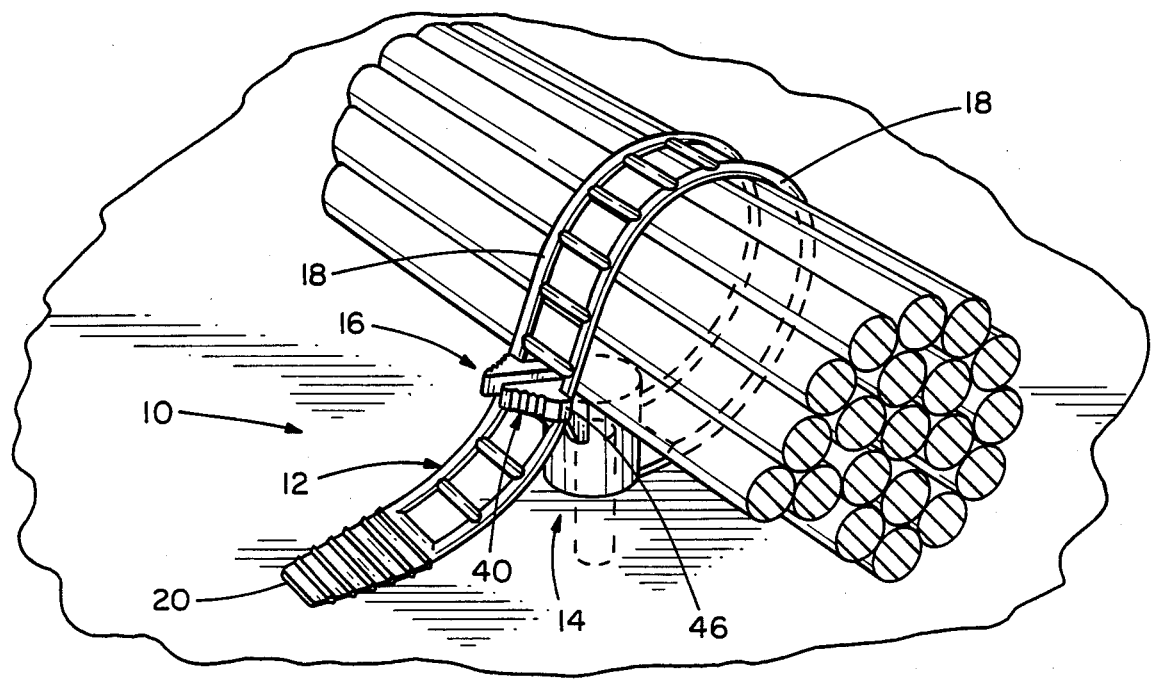
FIG. 1 is a perspective drawing of a releasable ladder tie embodying the concept of the present invention shown securing a bundle of wires to a stud.

A releasable ladder fastener embodying the concept of the present invention is designated generally by the number 10 in the accompanying drawings. Fastener 10 is preferably of injection molded integral thermoplastic construction.

Fastener 10 includes a ladder strap 12, a stud mount boss 14 and a releasable latch 16.

Ladder strap 12 includes spaced parallel coextensive side rails 18 extending between and connecting a tapering truncated tip 20 and stud mount boss 14. Rungs 22 are disposed perpendicular to side rails 18 and are equally spaced along the length thereof to join parallel side rails 18 to form ladder strap 12. Rungs 22 are formed having a radius at leading and trailing faces 24 and 26, as seen in the sectional drawing of rungs 22 in FIG. 4.

Figure 2:
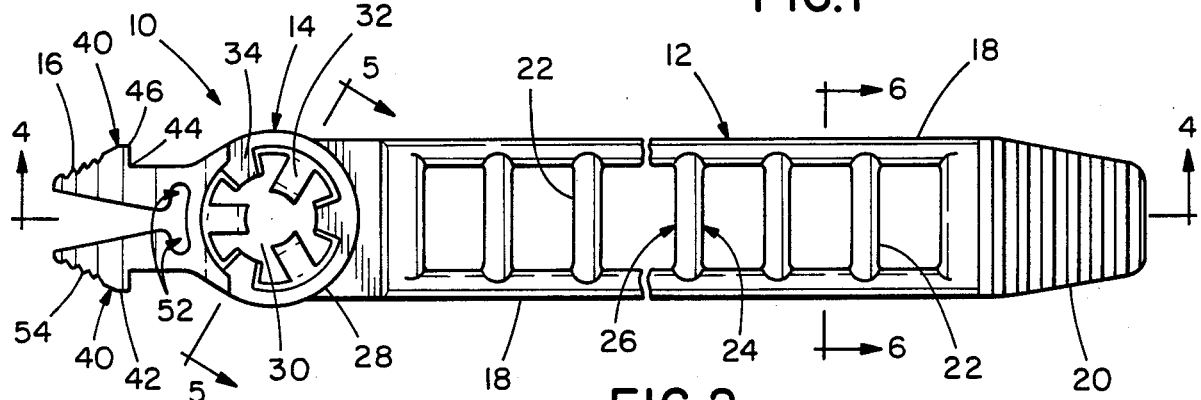
FIG. 2 is a plan of the fastener of FIG. 1.

Stud mount boss 14 includes a cylindrical socket 28, having a formed stud mount bore 30. Three resilient fingers 32 and three guidance ribs 34 are formed within bore 30. Resilient fingers 32 are equally spaced around the circumference of bore 30, disposed to project radially inwardly, as seen in FIG. 2, with their centerlines aligned to intersect the center line of bore 30. One of resilient fingers 32 is formed on the portion of socket 28 adjacent releasable latch 16 with its length being aligned with the centerline of ladder strap 12. As seen in FIG. 5, resilient fingers 32 project upwardly from a stud entry face 36 towards a stud exit face 38 of socket 28 forming a 45 degree angle with the centerline of socket 28.

Guidance ribs 34 project radially inwardly, as seen in FIG. 2, with their center lines aligned to intersect the center of bore 30; guidance ribs 34 being equally spaced around the circumference of bore 30. As seen in FIG. 2, one of guidance ribs 34 is formed on the portion of socket 28 adjacent ladder strap 12 with its length being aligned with the centerline of ladder strap 12. Guidance ribs 34 extend substantially the length of bore 30 tapering outwardly adjacent entry face 36. Guidance ribs 34 define the maximum diameter of a stud that can be utilized to mount fastener 10. Resilient fingers 32 extend radially inwardly past guidance ribs 34 and are protected from stress induced plastic deformation by guidance ribs 34; guidance ribs 34 preventing the expansion of fingers 32 beyond their resilient limit.

Figure 3:
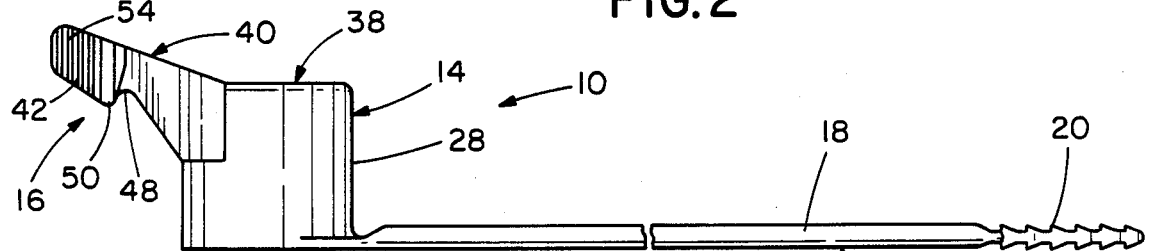
FIG. 3 is a side view of the fastener of FIG. 1.

Releasable latch 16 includes two opposed locking members 40 formed on the portion of socket 28 adjacent stud exit face 38 and extending in the opposite direction of ladder strap 12. As seen in FIG. 3, locking members 40 preferably extend outwardly of stud exit face 38 at an angle of 20 degrees to the plane of the face of stud exit face 38 or ladder strap 12. Each locking member 40 includes a head portion 42 the peripheral contour of which, as seen in FIG. 2, tapers outwardly from the outermost extent of locking member 40 until it extends inwardly at a side rail latching recess 44 to form a locking barb 46. The 20 degree outward disposition of locking members 40 advantageously presents head portions 42 of locking members 40 at an optimal position spaced from stud entrance face 36 and thus the mounting surface, facilitating the release of ladder strap 12 of a mounted fastener 10 by providing sufficient clearance to effectively grasp and release releasable latch 16; any greater angle causing locking members 40 to unnecessarily increase the overall height of an applied fastener 10 when used to fasten small bundles and any lesser angle reducing the ease of manipulation of releasable latch 16.

Referring now to FIG. 3, the bottom contour of each looking member 40 tapers downwardly from the outermost extent of locking member 40 until it extends upwardly at rung latching recess 48 to form a locking ridge 50. Locking ridges 50 of locking members 40 are aligned to receive a rung 22.

Figure 4:
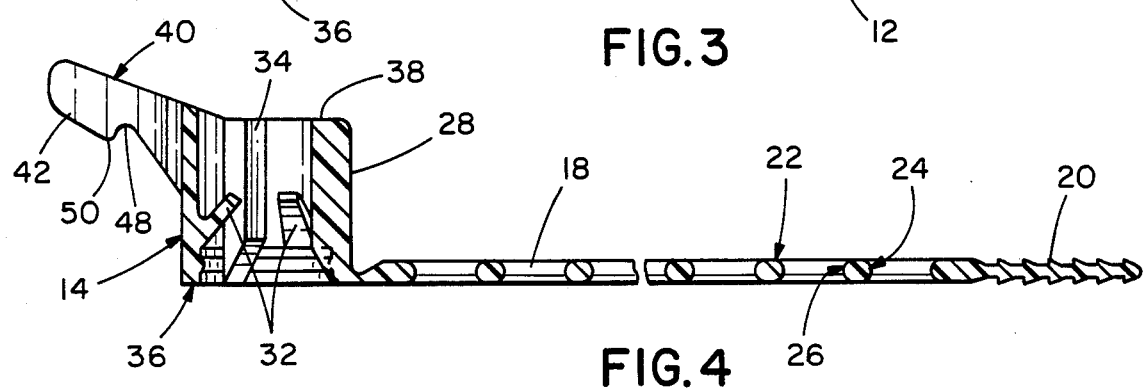
FIG. 4 is a sectional view of the fastener of FIG. 1 taken along line 4—4 of FIG. 2.

Each opposed locking member 40 is resiliently mounted to socket 28 by forming a section of reduced thickness in each locking member 40 adjacent hinge recesses 52 to increase the flexibility of locking members 40. The flexibility of locking members 40 can be selected by varying the depth of hinge recesses 52 to select the desired level of force necessary to insert and release latch 16. The height of each locking member 40, as seen in FIG. 4, is increased at the region of reduced thickness of locking members 40 to provide increased tensile strength in locking member 40 in the direction of its length to counter balance the reduction in tensile strength caused by the areas of reduced thickness. Spaced apart locking members 40 are formed such that inward force applied to locking members 40 resiliently deforms the members 40 inwardly and removal of the inward force allows the locking members 40 to return to their as molded position. Gripping ridges 54 are formed on the outwardly directed surfaces of head portion 42 to facilitate manual deformation of locking members 40.

Referring now to FIGS. 1 and 7, fastener 10 is applied by encircling the wires to be fastened with ladder strap 12, and inserting releasable latch 16 between adjacent rungs 22. Locking members 40 resiliently deform inwardly as they are inserted between adjacent rungs 22; biasing opposed locking barbs 46 outwardly against side rails 18 to engage side rails 18 within side rail latching recesses 44. In addition the one of the adjacent rungs 22 closest strap tip 20 of ladder strap 12 is received within aligned rung latching recesses 48 of locking members 40 to secure ladder strap 12 to releasable latch 16. Fastener 10 can be released by displacing locking members 40 inwardly and withdrawing ladder strap 12 to remove releasable latch 16 from ladder strap 12. An applied fastener 10 can also be simply and quickly released with one hand by grasping strap tip 20 and pulling ladder strap 12 away from the mounting surface with sufficient force to deform locking members 40 inwardly and release ladder strap 12 from releasable latch 16.

Fastener 10 can be mounted to a stud having a distal collar as shown in FIG. 7 or mounted to a threaded stud, bolt or the like by inserting the stud into stud mount bore 30 at stud entry face 36 either before or after fastener 10 is secured around a bundle. The height of a mounting stud is selected to prevent the stud from projecting past stud exit face 38 to protect wires bundled within fastener 10.

I claim:

1. A releasable ladder fastener, comprising:
a ladder strap portion including a pair of elongate parallel side rails joined by a plurality of spaced interposed rungs;
fastener mounting means for securing the fastener to a mounting surface formed adjacent an end of the strap portion; and
resilient latching means for engaging the side rails of the strap portion formed on the fastener mounting means, the latching means including two spaced apart opposed resiliently mounted locking members that each engage on of the side rails within respective side rail latching recesses of the locking members to releasably lock the resilient latching means within the ladder strap portion, the locking members as molded being spaced apart an amount greater than the inner width of the spaced apart rails such that as the locking members are inserted between the rails the locking members are displaced inwardly whereby the locking members are resiliently biased outwardly to releasably engage the side rails within the side rail latching recesses, said locking members being moveable from a first latched position wherein said locking members are spaced apart an amount greater than the inner width of said spaced apart side rails to a second position wherein said locking members are biased toward one another and spaced apart an amount less than the inner width of said spaced apart side rails whereby said locking members may be biased toward one another and removed from said side rails.

2. A fastener as set forth in claim 1, wherein the resilient latching means includes means for releasably engaging on of the rungs within a rung latching recess.

3. A fastener as set forth in claim 1, wherein the resilient latching means includes a locking ridge formed on a lower surface of each of the resilient locking members adjacent a rung latching recess, the locking ridge being disposed to releasably engage a rung of the ladder strap upon insertion of the resilient latching means between adjacent rungs.

4. A fastener as set forth in claim 3, wherein the resilient locking members each include an area of reduced thickness formed by a hinge recess in an inner peripheral edge of the locking member, between the side rail latching recesses and the fastener mounting means to increase the flexibility of the locking members.

5. A fastener as set forth in claim 4, wherein each of the resilient locking members projects away from the ladder strap portion and outwardly of the fastener mounting means at an angle to the plane of the ladder strap portion.

6. A fastener as set forth in claim 1, wherein each of the resilient locking members includes a locking barb formed on an outer peripheral edge of the locking member adjacent the side rail latching recess, the locking barbs being disposed to releasably engage the side rails of the ladder strap portion upon insertion of the resilient latching means between adjacent rungs.

7. A fastener as set forth in claim 6, wherein the resilient locking members each include an area of reduced thickness formed by a hinge recess in an inner peripheral edge of the locking member, between the locking barb and the fastener mounting means to increase the flexibility of the locking members.

8. A fastener as set forth in claim 7, wherein each of the resilient locking members projects away from the ladder strap portion and outwardly of the fastener mounting means at an angle to the plane of the ladder strap portion.

9. A releasable ladder fastener, comprising:
a planar ladder strap portion having a pair of elongate parallel rails joined by a plurality of spaced interposed rungs;

fastener mounting means for securing the fastener to a mounting surface, formed adjacent an end of the strap portion; and two elongate resilient locking members formed on the fastener mounting means, the locking members including opposed locking barbs formed on their respective outer peripheral edges, the locking barbs as molded being spaced apart an amount greater than the inner width of the spaced apart rails such that as the barbs are inserted between the rails the locking members are resiliently displaced inwardly and as the barbs are inserted beyond the rails the barbs are resiliently biased outwardly against the rails to releasably engage the rails of the ladder strap portion, said locking members being moveable from a first latched position wherein said locking members are spaced apart an amount greater than the inner width of said spaced apart rails to a second position wherein said locking members are biased toward one another and spaced apart an amount less than the inner width of said spaced apart rails whereby said locking members may be biased toward on another and removed from said side rails.

10. A fastener as set forth in claim 9, wherein the resilient locking members include aligned locking ridges formed on a lower surface of each of the resilient locking members, the locking ridges being disposed to releasably engage a rung of the ladder strap upon insertion of the resilient locking members between adjacent rungs.

11. A fastener as set forth in claim 10, wherein the resilient locking members each include an area of reduced thickness formed by a hinge recess in the inner peripheral edge of the locking member, between the locking barb and the fastener mounting means to increase the flexibility of the locking members.

12. A fastener as set forth in claim 9, wherein the locking members project away from the ladder strap and wherein the locking members form an angle to the plane of the ladder strap portion.

* * * * *

UNITED STATES PATENT AND TRADEMARK OFFICE
CERTIFICATE OF CORRECTION

PATENT NO. : 4,728,064
DATED : March 1, 1988
INVENTOR(S) : Jack E. Caveney

It is certified that error appears in the above-identified patent and that said Letters Patent are hereby corrected as shown below:

Column 4, line 5, change "on" to --one--.

Column 4, line 28, change "on" to --one--.

Signed and Sealed this

Twenty-fifth Day of April, 1989

Attest:

DONALD J. QUIGG

Attesting Officer

Commissioner of Patents and Trademarks